United States Patent
Rao

(10) Patent No.: US 6,449,486 B1
(45) Date of Patent: Sep. 10, 2002

(54) MULTIPLE LOCATION ESTIMATES IN A CELLULAR COMMUNICATION SYSTEM

(75) Inventor: Padmanabha R. Rao, Milpitas, CA (US)

(73) Assignee: Polaris Wireless, Inc., Santa Clara, CA (US)

( * ) Notice: Subject to any disclaimer, the term of this patent is extended or adjusted under 35 U.S.C. 154(b) by 0 days.

(21) Appl. No.: 09/318,678

(22) Filed: May 25, 1999

Related U.S. Application Data

(60) Provisional application No. 60/086,950, filed on May 27, 1998.

(51) Int. Cl.[7] ............................................. H04Q 7/20
(52) U.S. Cl. ................... 455/456; 455/422; 455/440; 342/352; 342/351.01
(58) Field of Search ......................... 455/456, 403, 455/436, 422, 437, 439, 440, 12.1, 13.2, 9; 342/352, 357.01, 357.06, 357.08

(56) References Cited

U.S. PATENT DOCUMENTS

| | | | | |
|---|---|---|---|---|
| 5,504,492 A | * | 4/1996 | Class et al. ................... 342/357 |
| 5,666,122 A | * | 9/1997 | Carter ......................... 342/357 |
| 5,907,809 A | * | 5/1999 | Molnar et al. ............... 455/456 |
| 5,955,986 A | * | 9/1999 | Sullivan ................ 342/357.05 |
| 5,970,414 A | * | 10/1999 | Bi et al. ...................... 455/456 |
| 6,021,330 A | * | 2/2000 | Vannucci ..................... 455/456 |
| 6,034,635 A | * | 3/2000 | Gilhousen ................... 342/457 |
| 6,052,064 A | * | 4/2000 | Budnik et al. ......... 340/825.44 |
| 6,163,696 A | * | 12/2000 | Bi et al. ...................... 455/436 |

* cited by examiner

Primary Examiner—William Trost
Assistant Examiner—Congvan Tran
(74) Attorney, Agent, or Firm—Townsend and Townsend and Crew LLP

(57) ABSTRACT

Technique for determining the location of a mobile unit in a wireless communication system and presenting it to a remote party. In a scenario with first and second position estimates, the first position estimate is presented within a first predetermined time interval of call setup between the mobile unit and the remote party, and, if the second position estimate is available for presentation to the remote party, the second position estimate is presented within a second predetermined time interval after presentation of the first position estimate. Else, status information on availability of the second position estimate is presented within the second predetermined time interval.

9 Claims, 4 Drawing Sheets

New Embodiment

MULTIPLE LOCATION ESTIMATES IN A CELLULAR COMMUNICATION SYSTEM

CROSS-REFERENCE TO RELATED APPLICATION

This application claims priority from the following U.S. Provisional Application, the disclosure of which, including all attached documents, is incorporated by reference in its entirety for all purposes:

application Ser. No. 60/086,950, filed May 27, 1998, of Paolo L. Siccardo and Padmanabha R. Rao, entitled "Multiple Location Estimates in a Cellular Communication System."

BACKGROUND OF THE INVENTION

The present invention relates generally to telecommunications, and more specifically to wireless messaging systems.

In connection with mobile communication systems, it is becoming increasingly important to determine the location of the communicating Mobile Unit (MU). Various systems for locating are already well known. One solution that is readily available in most modem cellular systems is to use the ID of the cell from which the MU is communicating. Typically, this information is accurate to a resolution of several miles. Another solution is to compute the location of the MU based on the cellular network signaling parameters (angle of arrival, time delay of arrival, signal strength, etc.). This information is typically accurate to several tens of meters. Yet another solution is to equip the MU with a GPS receiver which then attempts to track the location of the MU as accurately as possible. Typically, GPS receivers can compute locations to within several tens of meters of accuracy. When combined with differential corrections, the accuracy can be improved to less than 10 meters with a high degree of probability, as is known to one skilled in the art.

As far as reliability is concerned the cell ID information is the most reliable, and is guaranteed to be available as long as the cellular network is functioning normally. The network signal based location computations are less reliable, since they are dependent on several conditions being true at the time of the call. For example, most schemes require the MU to have line-of-sight visibility to multiple cellular base stations. This is not always possible. GPS based location computation is also not always reliable since the MU may be in an environment where there is no penetration of the GPS satellite signals.

SUMMARY OF THE INVENTION

The present invention provides techniques for determining the location of a mobile unit in a wireless communication system and presenting it to a remote party.

According to one aspect of the invention, the multiple location estimates available, each with possibly different resolution, reliability and latency, are presented in a consistent manner to the remote party thus enabling it to provide a consistent level of service to the user of the mobile unit.

Thus, in a scenario with first and second position estimates, the first position estimate is presented within a first predetermined time interval of call setup between said mobile unit and said remote party, and, if the second position estimate is available for presentation to the remote party, the second position estimate is presented within a second predetermined time interval after presentation of the first position estimate. If the second position estimate is not available for presentation to the remote party within the second predetermined time interval, status information on availability of the second position estimate is presented within the second predetermined time interval.

In specific embodiments, the first position estimate is derived from the identity of the cell in which the mobile unit is located, from a multitude of cell identities provided to the remote party by the mobile unit, or from the interaction of the mobile unit with the wireless network. In some embodiments the status information includes the expected time of arrival of the second position estimate. In specific embodiments, the second position estimate is derived from a GPS receiver embedded in the mobile unit. In such embodiments, the status information includes one or more of the state of the GPS receiver in the mobile unit and the availability of satellite signals to the GPS receiver in the mobile unit.

In some embodiments, if the second position estimate is available, the second position estimate is presented to the remote party after presentation of the expected time of arrival, but if the second position estimate is not available at the expected time of arrival, a second status update is presented to the remote party.

In embodiments where additional position estimates are potentially available, a similar sequencing of presentation of position estimates and status information can be implemented.

According to another aspect of the invention, the prior art cell identity based location estimate is further refined by designing a mobile unit that is capable of capturing the cell identity values from other networks in its neighborhood. The captured values are transmitted over the communication network to the remote party where all the identified cells are overlaid on a map of the locality. The final location estimate is the region of intersection of all the identified cells. This estimate is typically superior to that obtained by transmitting only one cell identity to the remote party.

A further understanding of the nature and advantages of the present invention may be realized by reference to the remaining portions of the specification and the drawings.

DESCRIPTION OF THE SPECIFIC EMBODIMENTS

The present invention provides a new method for computing the location estimate of an Mobile Unit (MU) in a cellular communication network and describes how such an estimate may be combined with other available location estimates and gracefully presented to another party remote from the MU.

Figure 1:
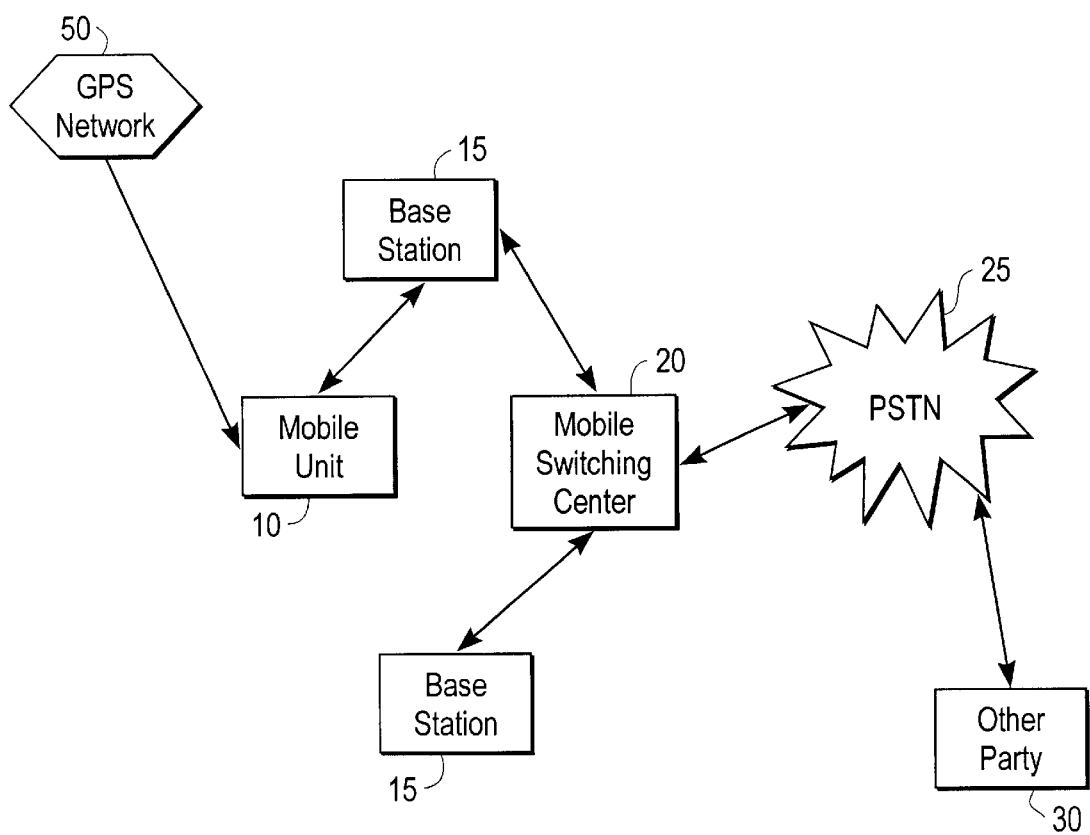
FIG. 1 shows a representative cellular communication system with a GPS receiver equipped Mobile Unit.

FIG. 1 is a high level block diagram of a cellular communication network. A Mobile Unit 10 has a connection with a cellular Base Station 15, which in turn is connected to a Mobile Switching Center (MSC) 20. The MSC typically supports multiple Base Stations, all of which are generically labeled 15 in the Figure. Calls that need to go out of the coverage area of the MSC are carried by a PSTN network 25 to which the MSC is connected. The call is terminated at an Other Party 30. The Other Party may or may not be mobile. (Calls to other MU's within the coverage area of the MSC are routed to the appropriate Base Stations for onward routing to the MU. These calls do not pass through the PSTN; however, FIG. 1 is illustrative and assumes Other Party 30 requires the PSTN for connection to the MU.) The connection mechanism described above is valid regardless of who originates the call. The location of the MU is of interest to the Other Party for several reasons such as provisioning of prompt and efficient personalized services, dispatching emergency assistance personnel, tracking the movements of the MU, etc.

In the specific embodiment MU 10 is equipped with a GPS receiver that is designed to receive the RF signals from a GPS network 50 and extract information therefrom to compute its location. Location information generated by the GPS receiver is selectively transmitted by the MU to the Other Party.

In the prior art, the Other Party has access to three different estimates of the location of the MU. These three estimates are generated using different technologies and independently of one another. Furthermore their accuracy, reliability and time to generate also differ significantly.

Figure 2:
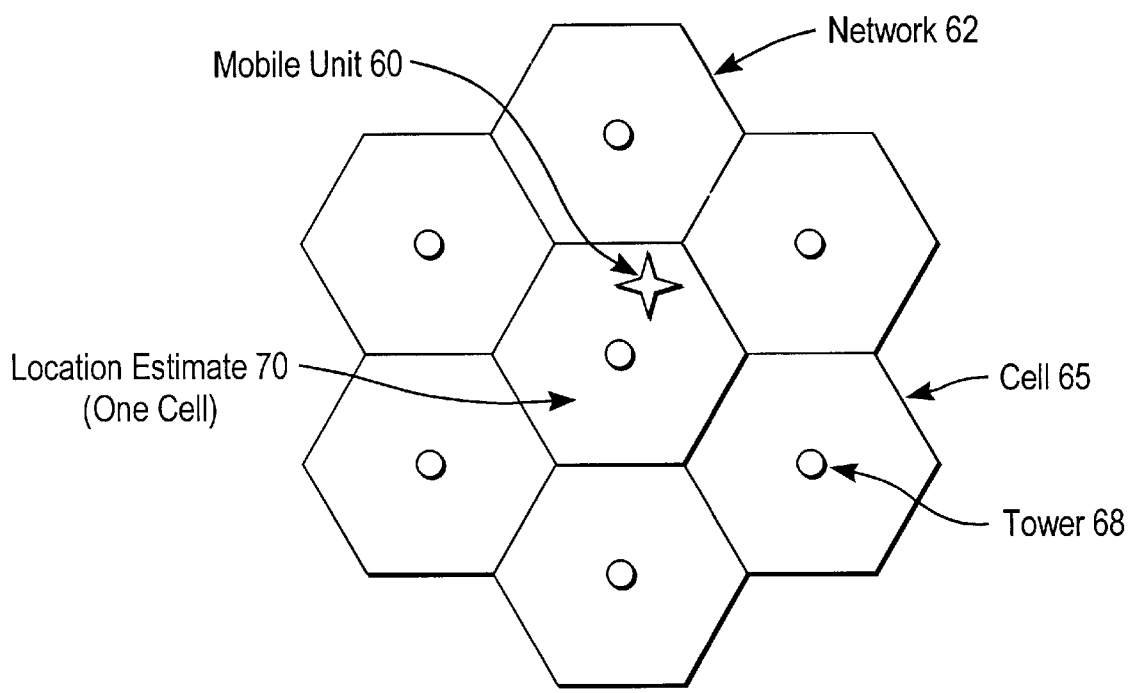
FIG. 2 illustrates the location estimate obtained by using cell ID information.

The first estimate is obtained from the cellular network directly. It is the area of the cell that the MU is currently located in. This is better described with reference to FIG. 2 wherein a MU 60 is within the geographical coverage area of a network 62. The coverage area is divided into a number of cells, represented by a cell 65, the size and shape of each cell determined by the location and operational characteristics of a corresponding tower 68. When MU 60 is connected to the network, the latter knows the identity of the cell the MU is located in. In FIG. 2 this cell is marked as a cell 70, and the area of cell 70 is thus the resolution of MU 60's location estimate.

Typically, a cell is several miles across. Since the resolution of the cell ID based location estimate is no better than the size of the cell that MU 60 is located in, the resolution offered by this estimate is typically no better than several miles. The advantages of cell ID based location estimate are: (1) it is naturally available as part of the cellular infrastructure, (2) it is obtained as soon as the call is established, and (3) it is always available.

The second estimate is obtained by performing sophisticated calculations on the signal parameters exchanged between the MU and the cellular network during the duration of the call. This estimate is referred to in this description as Network Computed Location (NCL) estimate. Such calculations can be performed either in the cellular network or in the MU or jointly in both. This method of computing the location estimate is inferior to the cell ID based method in that it is less reliable and takes additional hardware and/or software to compute. The unreliability comes from the fact that there are situations where MU 10 may not have a sufficiently clear communication access to the cellular network to enable an accurate location estimate computation. It is, however, superior to the cell ID based method in that its resolution can be much better—typically of the order of several tens of meters.

The third estimate is obtained from the GPS receiver embedded in MU 10. Under software control in the MU this location estimate is transmitted to the Other Party via the cellular network. The GPS method of computing the location requires additional complexity in the MU as compared to either of the two methods described above. Similar to the second method described above, it is also not always reliable since GPS signals are not available everywhere. However, if the GPS signals are available, it is possible to refine the location estimate to an accuracy of better than 10 meters by applying differential corrections. A characteristic of the GPS based location estimate is that the time required to arrive at the estimate is not deterministic, since it depends on the initial state of the GPS receiver.

The present invention describes a new method of estimating the location estimate of the MU that has similar advantages as the cell ID based estimate described above, but with potentially superior resolution. The invention takes advantage of the fact that any given location typically falls under the coverage of more than one wireless communication network. The different wireless networks may not all comply with the same technology, although in some situations some of the overlapping networks may indeed implement a common technology. For example, in Europe it is common to find two or more GSM networks having overlapping coverage. There are other networks, not typically classified as "cellular", such as DECT, as is well known to one skilled in the art, which also overlap in coverage with the GSM networks. In the US too, it is common to find more than one cellular network operating over a common geographical area. Of course, as is well known, the US has multiple cellular technologies such as AMPS, GSM, TDMA, and CDMA. Any combination of these networks may have overlapping coverage. In Japan, the PHS network is widely prevalent and overlaps in many areas with traditional cellular networks.

One of the basic features of all wireless networks is the concept of cell beacons. Cell beacons are essentially pre-defined signals transmitted by the network over predefined or determinable frequencies. The beacons are continuously transmitted. The purpose of the beacon is to make available certain basic information such as the identity of the network and of the cell to the MU's. This allows any MU in the cell's coverage area to be aware of the availability of the network as well as carry out certain pre-defined measurements such as signal strength. The format of the beacon signal is different for each communication standard, but for each standard it is well defined and publicly known.

In the prior art technology, an MU is designed to comply with a pre-determined set of communication technologies, and thus can operate in conjunction with only the corresponding networks. For example, an MU designed to operate with the US PCS 1900 GSM technology will be able to interact only with a US PCS 1900 GSM network. Similarly, a dual-mode MU designed to operate with CDMA and AMPS technologies can interact only with CDMA and AMPS networks. Additionally, the operation of the MU may be even further restricted, at the time of activation of service typically, to a pre-specified number of networks. For example, a particular network operator may restrict all MU's given to its subscribers to operate over only its network and possibly over the networks of some "friendly" networks. This means that a prior art MU only attempts to "listen" to the beacon signals emanating from the networks it is restricted to operate with and ignores the beacon signals emanating from other networks. The beacon signals are essential to the proper operation of the MU by enabling it to make vital decisions such as which frequency to use and which tower to communicate with. Reception of a particular beacon signal by the MU implies that the MU is either within or very close to the cell identified by the beacon.

The present invention extends the prior art by enhancing the MU's to listen to multiple beacons, even those that do not emanate from its network. This task is easier if the different networks employ the same technology (such as GSM, AMPS, CDMA or TDMA), since no added circuitry is needed in the MU to decode the other beacon signals. However, it is also possible to design MU's that can decode the beacon signals of networks that use a different technology than the MU's primary network(s). For example, an MU designed to operate with GSM technology can be straightforwardly augmented to decode the beacon signals emanating from a European DECT network.

As mentioned previously, the beacon signals contain various pieces of information; in particular, they contain the identity of the network from which they emanate and the cell in which they are broadcast. An MU designed in accordance with the principles of this invention captures as many beacon signals as it possibly can and extracts at least the network and cell identity values from each one of them. These values are stored in internal memory and updated as required, i.e., as the MU moves to different cells and/or finds new beacon signals.

Beacon signals are not the only means by which a network makes its basic information known to a mobile unit, as is known to one skilled in the art. In one embodiment, the mobile unit broadcasts a predetermined query message and awaits a response from the network. The network responds by broadcasting its information which is captured by the mobile unit. In other words, the mobile unit requests the beacon information from the network in this case.

Referring back to FIG. 1, in accordance with the invention, the network and cell identity values stored in MU 10's internal memory are also selectively transmitted to Other Party 30. This information is in addition to the previously mentioned three location estimates transmitted from MU 10 to Other Party 30. In accordance with this invention, Other Party 30 is equipped a priori with topology information of all the different networks available in the vicinity of MU 10. In particular, Other Party 30 has a database that contains, for each network, the geographical layout of the cells along with the identity of each cell. In further accordance with the invention, Other Party 30 is also equipped with the ability to overlay the cell-layout over a visual map of the region (say on a computer screen), thus enabling a human operator to exactly see the coverage of each cell.

Figure 3:
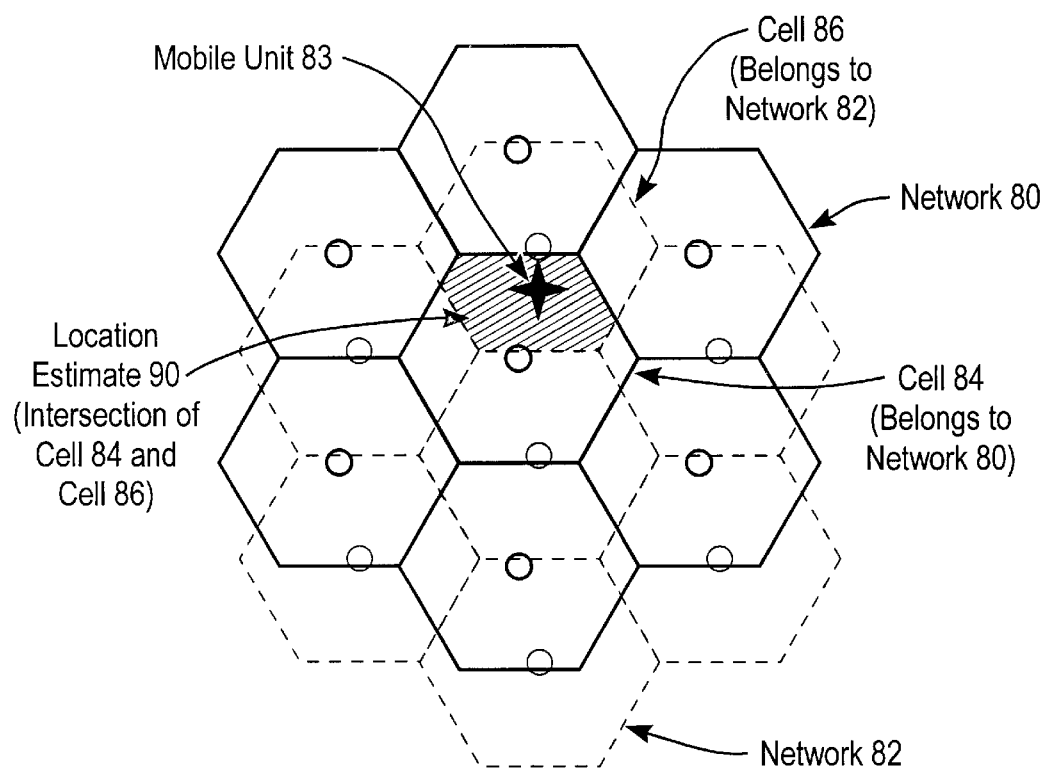
FIG. 3 illustrates how the location estimate can be improved by intersecting cells from more than one network.

On receipt of the beacon information from the MU, the Other Party extracts the network and cell identity values, and for each network highlights on the geographical map the identified cell. This is illustrated in FIG. 3 for the case when the MU captures beacon signals from two networks, a Network 80 and a Network 82 whose cells are drawn in dashed lines. In the illustration it is assumed that the MU communicates to the Other Party over Network 80. The beacon signal captured by a MU 83 from Network 80 indicates that it is within cell 84. At the same time, the beacon signal captured from Network 82 indicates to the Other Party that it is within a cell 86 of Network 82 (although it is not communicating over Network 82). In accordance with the invention, by superimposing the cell topologies of the two networks on the map and highlighting cell 84 of Network 80 and cell 86 of Network 82 the Other Party can improve the location resolution by inferring that MU 83 is located in the intersection of cells 84 and 86. This is illustrated by a highlighted region 90 in FIG. 3. A prior art MU communicating over Network 80 would ignore the beacon from Network 82, and thus the Other Party would not be able to derive a location estimate for the prior art MU that is better than the size of cell 84. Region 90 is smaller than either cell 84 or cell 86 and thus is a better estimate of the location of the MU.

For purposes of clarity, further reference in this description to the novel scheme described above is made using the phrase Multiple Beam Location estimate, or MBL estimate.

In situations where there is no additional beacon available the proposed scheme degenerates to the cell ID based estimate. The major advantage of this scheme is that it can be implemented with no additional hardware cost to the network infrastructure. If it is known in advance that the MU will be used in areas covered by multiple networks that use the same technology or technologies that it is designed to comply with (e.g., GSM, CDMA, etc.), then all the modifications required in a prior art MU to take advantage of the proposed scheme may be implemented in software. For example, a dual-mode MU that is capable of communicating over a CDMA and AMPS network can be augmented to capture the beacon signals from both networks without requiring additional hardware.

Referring back to FIG. 1, the present invention further provides a method for capturing the available location estimates of MU 10 and presenting them to Other Party 30 in such a manner that Other Party 30 can provide the requested services to MU 10 in an efficient manner. Presentation of location information to Other Party 30 is complicated by virtue of the fact that the available estimates are generated independent of one another, have different resolutions, are all not available at the same time, and have different degrees of reliability. In fact, the reliability decreases as accuracy increases. [It is noted that "reliability" is used to indicate probability of availability of the estimate, not necessarily the degree of trustworthiness of the estimate.] Thus, in order for Other Party 30 to be able to provide location based services to MU 10 on a consistently efficient basis, it not only needs to have the best estimate of MU 10's location in the shortest possible time, but also needs to obtain this information in a consistent manner. In other words, there should be no variability in the way the information is presented to Other Party 30, even though there is variability in the way it is generated.

Figure 4:
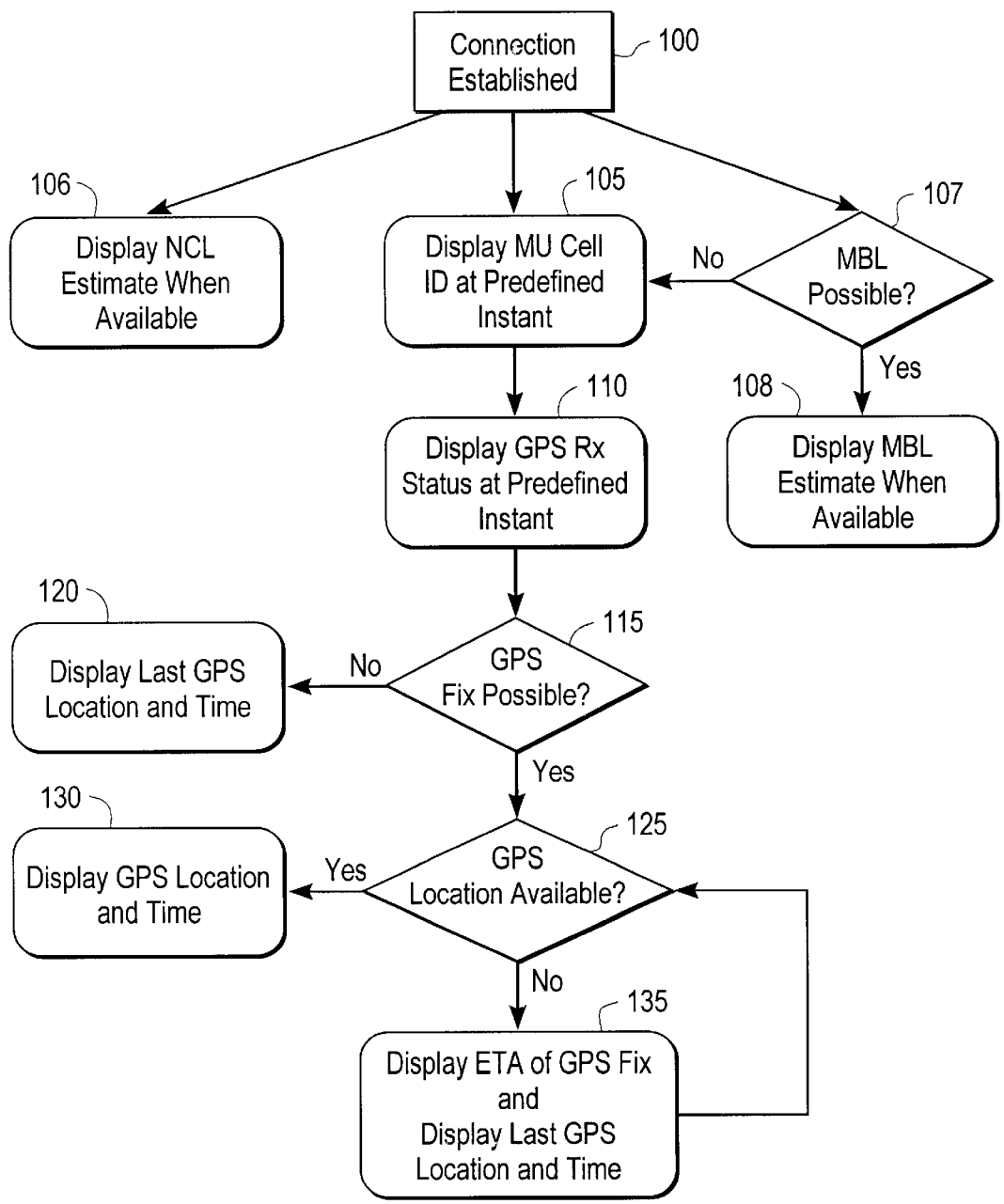
FIG. 4 shows a flow diagram of the Mobile Unit location presentation process.

FIG. 4 is a flow-diagram of one embodiment of this invention that shows how location information of MU 10 is efficiently presented to Other Party 30. The actual presentation medium is not of any relevance to this invention—it could be visual, as on a computer monitor screen, audible, or text based. For convenience, in the sequel, the word "display" and "presentation" are used interchangeably.

Soon after the connection between MU 10 and Other Party 30 is established as shown in Box 100, the first location estimate, namely MU 10's cell ID, is presented to Other Party 30. Since the cell ID information is obtained as part of the call setup process, the presentation of this information can be guaranteed to occur within a predetermined time interval. This is indicated by Box 105.

The NCL estimate is also generated by the cellular network and typically neither MU 10 nor Other Party 30 has any control over its availability and/or accuracy. Furthermore, neither can predict its availability. As a result, the NCL estimate is presented to Other Party 30 by the cellular network whenever it is available. This is shown by Box 106.

The MBL estimate is generated based on availability of multiple beacons at the site of the MU. This is not under the control of the MU. Even if multiple beacons are available, the accuracy of the estimate cannot be predicted. In situations where they are not available, the MBL estimate degenerates to the cell ID estimate, as described previously, and there is no need to present it to the Other Party. However, the MU can determine reasonably quickly, and within a predetermined interval of time, if indeed it has access to multiple beacons. This information can be transmitted to the Other Party and presented within a predetermined interval of time, as shown by Box 107. The exact mechanism of transmitting this information is not relevant to the invention and is therefore not described in detail here. However, one skilled in the art can appreciate that there exist several techniques for transmitting data over cellular networks, and any one of those techniques could be employed.

If multiple beacons are available, the MU captures the required information from each beacon and transmits it to the Other Party. The transmission can occur within a predetermined interval of time. The exact mechanism of transmitting the beacon information once it is available in the MU is not described here since it is well known to one skilled in the art. On receiving this data the MBL estimate can be computed and presented to the Other Party. This is shown by Box 108.

The availability of the fourth location estimate, namely from the GPS receiver in the MU, is also not under the control of the MU or the Other Party, however, the MU can predict quite accurately if and when the estimate will be available. If the MU is currently in an environment where there is no GPS signal available, the MU immediately recognizes this condition. If the MU is in an environment where it does have adequate access to GPS signals, then it can estimate the time required to compute the location. This time is not always the same and is in fact dependent on the state of the GPS receiver at the beginning, as is known to one with skill in the art. If the receiver is in "warm" state then it can obtain the location estimate (also called as "fix" in prior art) quickly (within a few seconds). On the other hand, if the receiver is in "cold" state, then it needs a lot of additional data from the GPS satellites, and the time to obtain fix can be several tens of seconds. The availability of GPS signals and state of the GPS receiver in the MU are transmitted over the cellular network to the Other Party and presented as described below.

After displaying the cell ID information to Other Party 30, information on the status of the GPS receiver at the time of call initiation is presented (Box 110 in FIG. 4). As mentioned above, availability of this information is under the control of the MU, and therefore, the time of its presentation can be set to occur within a predetermined window. Status information typically includes an indication of the state of the receiver (i.e., "warm", "cold", etc.), whether adequate GPS signal coverage is available, and expected time to obtain a fix. If a fix is not possible to obtain, as indicated by query Box 115, the Other Party is presented by the most recently obtained GPS location estimate along with the time of that fix (Box 120). This information may be used by Other Party 30 as appropriate. For example, depending on the time of the last fix it may be quite close to the MU's current location (as can be inferred by comparing this location estimate with the cell ID information previously obtained), and can thus be used for providing the service. On the other hand, if the last location was taken significantly in the past, and/or if the MU has moved substantially since that time, then it may not be very relevant to the Other Party.

If a fix is possible, and indeed if the final fix has already been obtained, the computed location estimate is displayed to the Other Party along with the time of the fix, as indicated by Boxes 125 and 130. On the other hand, if final fix has not yet been obtained, the expected time of availability (ETA) of the fix is displayed, as shown in Box 135. As described above, the ETA is easily computed based on the initial state of the GPS receiver. Along with the ETA, the last known GPS location estimate and its time is also displayed. Once the fix is obtained, the final location estimate is displayed along with the time (Box 130).

The embodiment described above offers an advantage to the Other Party in that the Other Party is presented with the MU's location estimate in a very consistent and logical manner. A coarse estimate in the form of cell ID is always presented first, and within a bounded time of call setup. The undeterministic nature of the most accurate location estimate, namely the GPS estimate, is completely compensated for by presenting to the Other Party at known and predetermined time instants, and in a predetermined sequence, the status of the GPS receiver, the ETA of the estimate, and finally, the actual location estimate itself. This enables the Other Party to provide any requested services in a consistent and efficient manner.

CONCLUSION

While the above is a complete description of specific embodiments of the invention, various modifications, alternative constructions, and equivalents may be used. Therefore, the above description should not be taken as limiting the scope of the invention.

What is claimed is:

1. A method for presenting a first and second position estimate of a mobile unit to a remote party in a wireless communication network, the method comprising:

presenting the first position estimate within a first predetermined time interval of call setup between said mobile unit and said remote party; and presenting the second position estimate within a second predetermined time interval after presentation of the first position estimate, if the second position estimate is available for presentation to the remote party, else presenting a status information on availability of said second position estimate within said second predetermined time interval after presentation of said first position estimate to said remote party.

2. The method of claim 1 wherein the first position estimate is derived from the identity of the cell in which the mobile unit is located.

3. The method of claim 1 wherein the first position estimate is derived from a multitude of cell identities provided to the remote party by the mobile unit.

4. The method of claim 1 wherein the second position estimate is derived from the interaction of the mobile unit with the wireless network.

5. The method of claim 1 wherein the second position estimate is derived from a GPS receiver embedded in the mobile unit.

6. The method of claim 5 wherein the status information consists of the state of the GPS receiver in the mobile unit.

7. The method of claim 5 wherein the status information consists of the availability of satellite signals to the GPS receiver in the mobile unit.

8. The method of claim 5 wherein the status information includes the expected time of arrival of the second position estimate.

9. A method for presenting a first and second position estimate of a mobile unit to a remote party in a wireless communication network, the second position estimate being derived from a GPS receiver embedded in the mobile unit, the method comprising:

presenting the first position estimate within a first predetermined time interval of call setup between said mobile unit and said remote party; and presenting the second position estimate within a second predetermined time interval after presentation of the first position estimate, if the second position estimate is available for presentation to the remote party, else presenting, within said second predetermined time interval after presentation of said first position estimate to said remote party, a status information including the expected time of arrival of the second position estimate, wherein if the second position estimate is available, the second position estimate is presented to the remote party at a time subsequent to presentation of the expected time of arrival, else if the second position estimate is not available at said expected time of arrival a second status update is presented to the remote party.

* * * * *